May 10, 1932. W. L. WRIGHT 1,857,578
MOTION PICTURE FILM
Filed Nov. 5, 1928
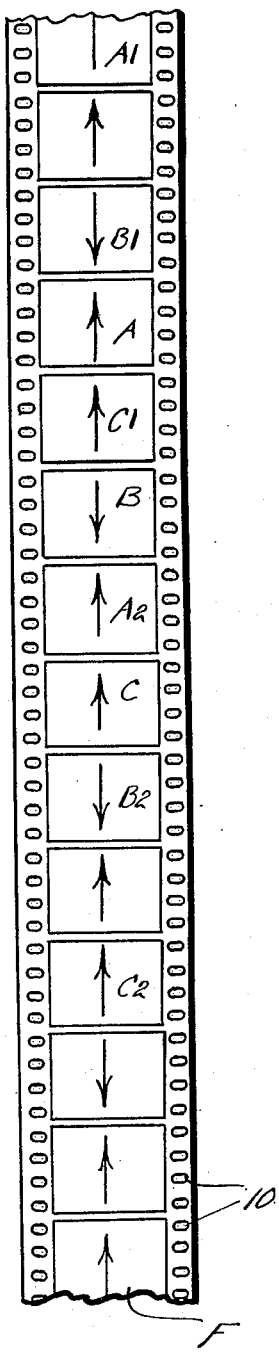
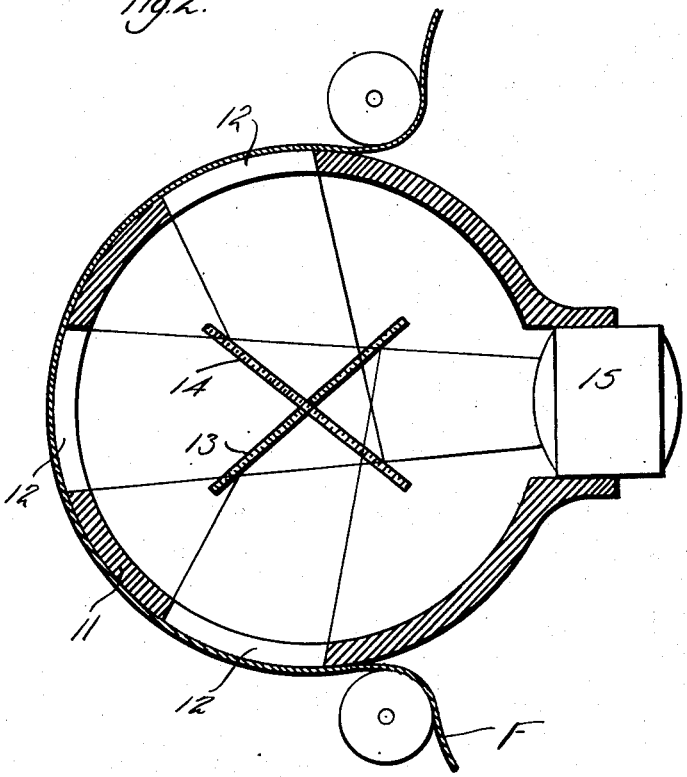
Inventor
Walter L. Wright.
by his Attorney Patented May 10, 1932

1,857,578

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

MOTION PICTURE FILM

Application filed November 5, 1928. Serial No. 317,386.

This invention has to do with a motion picture film and relates particularly to a film for color motion picture work. It is a general object of this invention to provide a film which is of practical commercial form and which facilitates the production of natural color motion pictures with the use of factors or units of apparatus which are commercially practical.

The production of natural color motion pictures presents various problems many of which appear at first to be of little importance but which in practice prove of great moment and make for the difference between commercial success and failure. It is recognized that tinting, or direct coloring of the film or portions of the film, is expensive and not altogether satisfactory and that two color methods do not give the natural color values desired. A method that will give the full natural color values and which has other very practical advantages requires simultaneous taking of a plurality of pictures of different color values or color sensations of a single subject from a single point of vision and on a single strip of film and the projection of the several pictures simultaneously on a screen in register using filters or other means to obtain the colors on the screen. For full color values, this general method requires that three pictures or color sensation records be taken simultaneously and that three such records be projected simultaneously.

Certain important factors must be taken into account in a commercially practical method of the type last mentioned, for example economy of film, or utilizing of film space, must be taken into account, the spacing of the several sensations or pictures of each series, or each group exposed simultaneously, must be such as to allow for clear definition between the pictures and such as to allow proper projection, and, further, the spacing of the film from the lens during exposure must be maintained within the range of focal lengths of lenses that can be used in practical motion picture photography.

It is an object of this invention to provide a film particularly useful in carrying out the said last mentioned type of process and which adequately provides for the various practical factors such as I have mentioned.

The objects accomplished by the present invention and the practical significance of the invention will be best understood from a detailed description of the invention and therefore I will proceed with such description and will make reference to the accompanying drawings, in which:

Fig. 1 is a more or less diagrammatic view illustrating a length of film embodying the principles of the invention, and Fig. 2 is a more or less diagrammatic view illustrating an optical system and manner of handling the film provided by the invention.

Before proceeding with the details of the invention, I wish to make reference to United States Letters Patent Number 1,217,391, issued February 27, 1927, to Colin Noel Bennett, of Penzance, England, as I believe such patent fairly and fully represents the state of the prior art. This patent covers the taking of a plurality of different color sensation records, or pictures of a subject, simultaneously and in spaced relation lengthwise on a film strip and the arranging of successive series so that the spaces between appertaining pictures of each series are occupied by pictures of other series, thus utilizing all of the available picture area of the film. In the handling of this film it is advanced, following each exposure or projection, a predetermined multiple of the distance or length of one sensation record or picture.

The present invention provides a film of the general type set forth in the Bennett patent above mentioned. The stock of the film F is preferably the standard motion picture film stock in the form of an elongate strip provided adjacent its edges with the usual sprocket perforations 10.

In accordance with my present invention, I provide meshing groups or series of pictures, or color sensation records, lengthwise of the film following the general teaching of the said Bennett patent. In Fig. 1 of the drawings I designate the three color sensation records or pictures of one series by the letters, A, B and C, it being understood that these pictures are of different color values of a single subject taken simultaneously and form a single angle or point of vision. Adjoining pictures of the series are spaced apart lengthwise on the film a distance corresponding to the length of a single picture and the pictures of adjoining series are located on the film to occupy the spaces. For example, as I have illustrated in Fig. 1, a series of pictures designated A1, B1 and C1 are arranged adjoining the first-mentioned series with the picture C1 occupying the space between the pictures A and B of the first-mentioned series. Another adjoining series of pictures A2, B2 and C2 are arranged with reference to the first-mentioned series with the picture A2 occupying the space between pictures B and C of the first-mentioned series. It will be apparent that the several pictures of each series are substantially spaced apart longitudinally of the film, the spaces between the pictures being occupied by pictures of adjoining series. In this way the entire available picture area of the film is utilized.

The outstanding feature of the present invention is the relative arrangement of the several pictures of each series on the picture area of the film, that is the present invention provides for the end pictures of the series, for instance the pictures A and C, being positioned or arranged alike in their respective areas, for example both upright, while the other or middle picture B is reversed, for example upside down. In the drawings I have shown arrows in the picture areas which arrows may be considered as representations of the subject. It will be seen that the arrows of pictures A and C point upwardly, or both in the same direction, while the arrow of picture B is upside down or points downwardly. In accordance with the principles of the invention, this relationship may be reversed, that is the arrows or subject of the end pictures A and C might be upside down while the subject of picture B might be rightside up. It is to be understood that when I use the term "reversed" I means reversed as to disposal on the picture area and not reversed from positive to negative or negative to positive. In the particular arrangement shown in Fig. 1 the subjects or pictures A and C would appear rightside up to a person viewing the film, while the picture B would appear upside down.

The practical significance of the film and picture arrangement above described will, I believe, be best explained by reference to an optical system and film handling arrangement which this film and picture arrangement permits. I will therefore now make reference to Fig. 2 of the drawings wherein I illustrate a film handling arrangement and optical system. In this mechanism the film F is carried on a curved, for instance circularly curved, guide 11 provided with spaced apertures 12 located to register with the several pictures of a series when the film is in operating position. Crossed transparent reflectors 13 and 14 are arranged within the guide 11 in the path of light passing through the apertures 12, and a lens device 15 is arranged in front of the crossed reflectors. In the case of a camera, the light from the subject enters through the single lens device 15, part of it passes through the middle aperture onto the middle picture area of the film, part of it passes from the lens device and is reflected by the reflector 14 through one of the end apertures 12 and onto one of the end picture areas, and part of it passes from the lens device onto reflector 13 and is reflected through the other end aperture 12 onto the other end picture area of the film. The reflectors 13 and 14 may be different chromatically, that is they may be differently colored glass reflectors so that only certain color values of the subject pass through both reflectors to reach the center picture area of the series, while other color values are reflected by the front face of reflector 14 and pass through reflector 13 to reach one end picture area of the series, while other color values are reflected by the front surface of reflector 13 and pass through reflector 14 to reach the other end picture area of the series. Thus by using crossed reflectors that are different chromatically, for instance crossed colored glass reflectors, the several pictures of the series are different chromatically or of different color values of the subject. An optical system of this general type is set forth and claimed in my copending application entitled Optical system, Serial Number 233,375, filed Nov. 15, 1927.

From consideration of the optical system above described it will be apparent that the shaft of light from the lens 15 will pass through both of the reflectors 13 and 14 and onto the center picture area of the film without being altered as to position, or without being reversed, by the reflectors, while the shafts of light reflected by the two reflectors are reversed. This results in the center picture of the series being reversed with reference to the two end pictures of the series. I have referred to the action taking place in a camera merely to give an understanding of an action such as may be obtained with an optical system and arrangement such as I illustrate in Fig. 2 and I have eliminated film moving or advancing means from the disclosure in order to simplify the disclosure. It is to be understood, of course, that any suitable film moving means may be provided and operated to advance the film F in the proper manner with reference to the guide 11.

Having described only a typical preferred form of my invention, I do not wish to limit myself to the specific details set forth, but wish to reserve to myself any change or variations that may appear to those skilled in the art or fall within the scope of the following claim.

Having described my invention, I claim:

A strip cinematographic film bearing color sensation records in sets each including three different color sensation records of the same movement phase taken from a single point of vision, the set of records being arranged longitudinally of the film strip and the middle picture of each set being inverted relative to the end pictures of the set, adjacent records of each set being spaced apart longitudinally of the film strip a distance corresponding to one record, the spaces between the records of each set being occupied by records of other sets.

In witness that I claim the foregoing I have hereunto subscribed my name this 9th day of October, 1928.

WALTER L. WRIGHT.